US010764651B1

(12) United States Patent
Almeida et al.

(10) Patent No.: US 10,764,651 B1
(45) Date of Patent: Sep. 1, 2020

(54) SERVICE GROUP DISCOVERY

(71) Applicant: CSC HOLDINGS, LLC, Bethpage, NY (US)

(72) Inventors: Heitor J. Almeida, Elmsford, NY (US); John Markowski, Smithtown, NY (US); Peter Caramanica, Bethpage, NY (US); Robert Tast, Bethpage, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/381,663

(22) Filed: Dec. 16, 2016

(51) Int. Cl.
| | |
|---|---|
| *H04N 21/61* | (2011.01) |
| *H04N 21/43* | (2011.01) |
| *H04N 21/00* | (2011.01) |
| *H04N 21/654* | (2011.01) |
| *H04N 21/438* | (2011.01) |
| *H04N 21/84* | (2011.01) |
| *H04N 21/485* | (2011.01) |
| *H04N 21/435* | (2011.01) |

(Continued)

(52) U.S. Cl.
CPC ......... *H04N 21/654* (2013.01); *H04N 21/235* (2013.01); *H04N 21/4147* (2013.01); *H04N 21/435* (2013.01); *H04N 21/4383* (2013.01); *H04N 21/47202* (2013.01); *H04N 21/485* (2013.01); *H04N 21/6118* (2013.01); *H04N 21/6168* (2013.01); *H04N 21/84* (2013.01)

(58) Field of Classification Search
CPC ........... H04N 21/6118; H04N 21/2225; H04N 21/2547; H04N 21/4524; H04N 21/6125; H04N 21/6405; H04N 21/812; H04N 21/2383; H04N 21/436; H04N 21/654; H04N 21/6168; H04N 21/235; H04N 21/4147; H04N 21/435; H04N 21/485; H04N 21/84; H04N 21/4383; H04N 21/47202

See application file for complete search history.

(56) References Cited

U.S. PATENT DOCUMENTS

| 7,246,366 | B1 * | 7/2007 | Addington | ............. | H04N 7/165 |
| | | | | | 348/E7.063 |
| 7,530,092 | B2 * | 5/2009 | McDowell | ........... | H04N 5/4401 |
| | | | | | 725/118 |

(Continued)

*Primary Examiner* — Mulugeta Mengesha
*Assistant Examiner* — Alazar Tilahun
(74) *Attorney, Agent, or Firm* — Sterne, Kessler, Goldstein & Fox P.L.L.C.

(57) ABSTRACT

Methods, systems, and machine-readable mediums for discovering a service group are provided. In an embodiment, a subscriber device receives a configuration file that stores a listing of mappings, each association of the listing of mappings maps network characteristics to a service group identification (SGID), a list of transport stream IDs (TSIDs), and a list of radio frequencies (RFs). The subscriber device selects one or more associations, from the listing of mappings, that are related to a network characteristic. Then, the subscriber device tunes to an RF, selected from the list of frequencies associated with a selected association, to identify a TSID of the tuned RF. Upon verifying whether the identified TSID matches a TSID from the list of TSIDs within the selected association, the subscriber device determines that the SGID in the selected association identifies the service group for the subscriber device.

18 Claims, 4 Drawing Sheets

(51) Int. Cl.
*H04N 21/472* (2011.01)
*H04N 21/4147* (2011.01)
*H04N 21/235* (2011.01)

(56) References Cited

U.S. PATENT DOCUMENTS

2005/0073579 A1* 4/2005 Lepine ................. H04N 5/4401
348/100
2011/0265116 A1* 10/2011 Stern ................... H04L 12/2801
725/35

* cited by examiner

200

| Plant ID | Network ID | SGID | TSID | RFs |
|---|---|---|---|---|
| 1 | 30 | 400 | 103, 51, 1005 | 465, 471, 483 |
| 1 | 30 | 401 | 10 | 579, 573, 603, 585, 46, 5, 471, 483 |
| 2 | 4 | 51 | 1010, 51, 500 | 555, 561, 471 |
| 2 | 2 | 72 | 1, 5, 1000, 73 | 579, 573, 603 |
| 2 | 2 | 73 | 1, 5, 1000, 73 | 585 |
| 2 | 30 | 3 | 66, 635 | 579, 621 |
| 3 | 10 | 400 | 103, 51, 1005 | 465, 471, 483 |

FIG. 2

SERVICE GROUP DISCOVERY

BACKGROUND

Field

Embodiments generally relate to operation of a cable communication system and including discovering a service group of a subscriber device of the cable communication system.

Related Art

A cable television (CATV) provider generally provides television, internet data, or other services to a content viewer via radio frequency (RF) signals transmitted to one or more customer premises through, but not limited to, optical fibers or coaxial cables. The content viewer may use a subscriber device, e.g., a set-top box (STB), to receive content, e.g., digital television (DTV) broadcasts, for display on a television.

In a CATV system, each subscriber device belongs to an assigned service group, identified by a Service Group ID (SGID). The CATV system assigns various subscriber devices to provide targeted content to groups of content viewers via their subscriber devices. When the content viewer requests access to a video-on-demand (VOD) or digital-video-recorder (DVR) program, the subscriber device transmits the associated SGID in its request to a headend of the CATV system. Upon verifying that the SGID is valid, the headend streams the requested program to the subscriber device via the associated service group.

In some conventional CATV systems, the subscriber device is preconfigured to tune to a single well-known frequency, i.e., a golden frequency, to retrieve the SGID identifying the appropriate service group. While this approach may be simple to process, this approach requires that all subscriber devices be pre-configured to tune to the single well-known frequency. Therefore, legacy subscriber devices or differently-configured subscriber devices cannot be readily re-configured to operate on the well-known frequency. Further, the use of a single frequency increases the risk of outages. This is because whenever the single well-known frequency is not in normal operation, the subscriber device can no longer discover the SGID needed in sending content requests.

In other conventional CATV systems, the subscriber device is preconfigured to communicate with the headend to obtain the SGID identifying the service group assigned to the subscriber device. This approach requires active communication between the headend and subscriber device, which may increase latency and the load processed of the headend.

Further conventional CATV systems may include different types of subscriber devices including those that operate on the single well-known frequency and those that communicate with the headend. There currently exists no efficient process for the subscriber devices to discover their assigned service group regardless of the type of the subscriber devices.

BRIEF DESCRIPTION OF THE DRAWINGS/FIGURES

The accompanying drawings, which are included to provide a further understanding of the disclosure and are incorporated in and constitute a part of this specification, illustrate exemplary embodiments. In the drawings:

FIG. 2 illustrates a service group discovery listing included in a configuration file according to an example embodiment;

Figure 4:
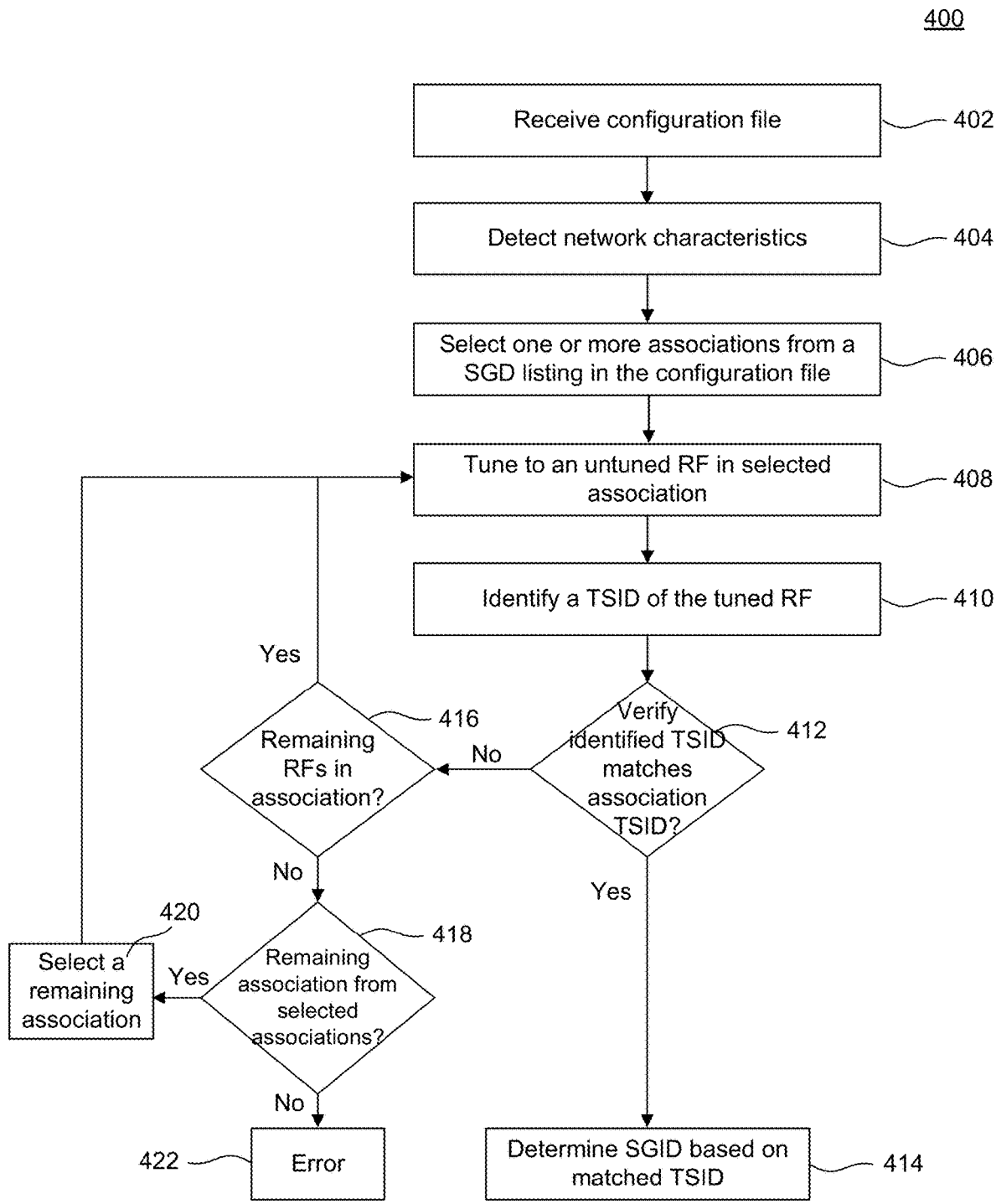

FIG. 4 illustrates a flowchart for service group discovery by a subscriber device according to an example embodiment; and The present disclosure will now be described with reference to the accompanying drawings. In the drawings, like reference numbers may indicate identical, functionally similar, or structurally similar elements. The drawing in which an element first appears is indicated by the leftmost digit(s) in the reference number.

DETAILED DESCRIPTION

Methods, systems, and machine-readable mediums disclosed herein enable a subscriber device to flexibly discover an associated service group (SG) regardless of the type of the subscriber device or the network architecture associated with the subscriber device. In an embodiment, the subscriber device receives a configuration file. The configuration file stores a listing of mappings where each association of the listing maps an SG identification (SGID) to network characteristics, a list of transport stream IDs (TSIDs), and a list of radio frequencies (RFs). The subscriber device selects one or more associations, from the listing of mappings, that are associated with a detected network characteristic. Then, the subscriber device tunes to an RF selected from the RF list in the one or more selected associations from the listing of mappings to identify a TSID of the tuned RF. The identified TSID identifies a transport stream received by the subscriber device via the tuned RF. The subscriber device verifies whether the identified TSID matches a TSID from a TSID list within the one or more selected associations from the listing of mappings. Thereafter, the subscriber device determines that the SGID in the one or more selected associations from the listing of mappings identifies the SG associated with the subscriber device.

Figure 1:
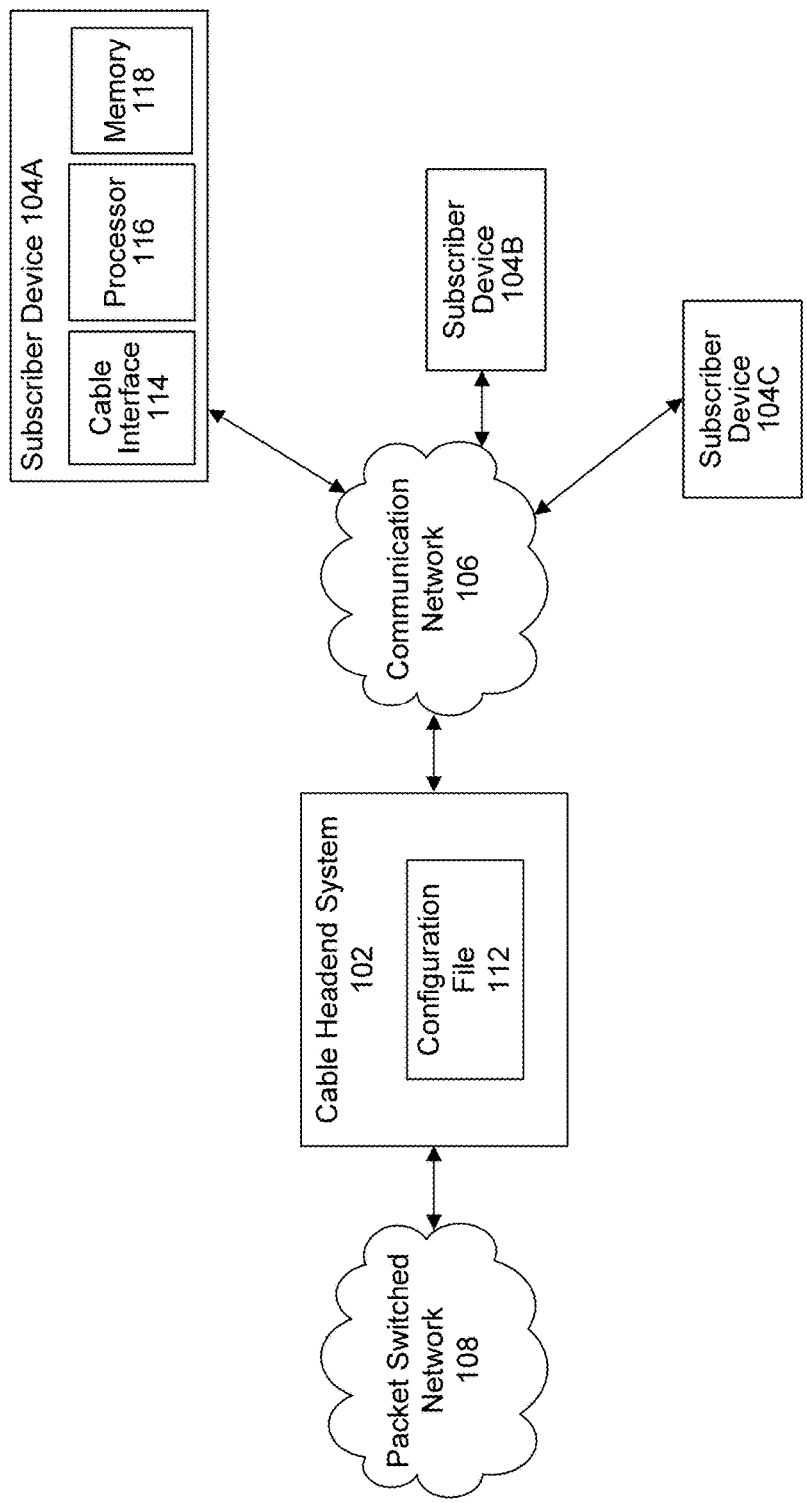
FIG. 1 illustrates a block diagram of a cable television system according to an example embodiment.

FIG. 1 is a block diagram of a point-to-multipoint communication system 100 according to an example embodiment. Communication system 100 facilitates bi-directional communication of information, such as video, audio, and/or data, between a cable headend system 102 and subscriber devices 104A through 104C, simply referred to as subscriber devices 104, via communication network 106, such as a hybrid fiber coaxial (HFC) cable network to provide an example. Although FIG. 1 illustrates subscriber devices 104A through 104C, those skilled in the relevant art(s) will recognize that communication system 100 can include any suitable number of subscriber devices 104 without departing from the spirit and scope of the present disclosure. Cable headend system 102 and subscriber devices 104 communicate with each other using a bi-directional transfer of packet-based traffic, such as Internet Protocol (IP) traffic to provide an example. Further, cable headend system 102 operates as an interface between communication network 106 and packet switched network 108 to transfer IP packets received from subscriber devices 104 to packet switched network 108 and to transfer IP packets received from packet switched network 101 to subscriber devices 104.

Communication network 106 provides a point-to-multipoint network topology for high speed, reliable, and secure transport of information between cable headend system 102 and subscriber devices 104. As will be appreciated by persons skilled in the relevant art(s), communication network 106 may include coaxial cable, fiber optic cable, or a combination of coaxial cable and fiber optic cable linked via one or more fiber nodes, and may include frequency translation devices to support a frequency stacking architecture, and may even include wireless links.

In an embodiment, communication system 100 may deploy Data Over Cable Service Interface Specification (DOCSIS) compliant equipment and protocols, or portions thereof, to provide the bi-directional (i.e., upstream and downstream) transfer of information, such as video, audio, and/or data, between cable headend system 102 and subscriber devices 104. As used herein, the term "downstream" refers to the transfer of information in a first direction from cable headend system 102 to the subscriber devices 104. The term "upstream direction" refers to the transfer of information in a second direction from the subscriber devices 104A through 104C to cable headend system 102. The DOCSIS Specification generally refers to a group of specifications published by CableLabs® that define industry standards for cable headend system 102 and subscriber devices 104. In part, the DOCSIS specification sets forth requirements and objectives for various aspects of cable modem systems including operations support systems, management, data interfaces, as well as network layer, data link layer, and physical layer transport for data over cable systems. A DOCSIS cable system includes two primary components: one or more subscriber devices 104, such as one or more set-top boxes to provide an example, at one or more customer premises, and cable headend system 102. In an embodiment, cable headend system 102 includes one or more cable modem termination system (CMTS) devices that are DOC SIS compliant. Though various embodiments herein are described in the context of using the DOC SIS standard, a person skilled in the art(s) will also appreciate that the embodiments described herein equally apply to other communication standards without departing from the spirit and scope of the present disclosure.

In an embodiment, cable headend system 102 may be implemented as a headend, or as a network of headends, that configures received media content, such as television (TV) content, into transport streams broadcasted to subscriber devices 104. Such media content may include television station's programming broadcasted from satellites or received via dedicated coaxial, microwave link, the Internet, or fiber-optic line installed between the television station and cable provider system 104. In an embodiment, the media content may include video on-demand (VOD) content or digital-video recorder (DVR) content received from one or more servers communicatively coupled, e.g. via packet switched network 108, to cable headend system 102.

In an embodiment, cable headend system 102 multiplexes several sub-streams of media content into a single transport stream for broadcasting on a certain RF. For example, a sub-stream may include encoded audio, encoded video, and/or encapsulated data. In an embodiment, cable headend system 102 configures the transport stream as MPEG transport streams, which is an industry-wide standard digital container format for transmission and storage of audio and video data. In an embodiment, each transport stream, e.g., an MPEG transport stream, also includes one or more listings of mappings that describe the types of information contained in the transport stream as well as information associated with the transport stream. For example, the listings may be in the form of tables where one of the tables includes a transport stream identifier (TSID) which is a unique value that identifies the transport stream. In an embodiment, a transport stream includes information within the one or more listings of mappings that relate to the network such as physical properties of the current network or the network broadcasting the transport stream. For example, these physical properties may include a network name or an associated network ID, which is a value that uniquely identifies the network broadcasting the transport stream.

In an embodiment, communication network 106 provides the physical infrastructure for carrying and transmitting transport streams from cable headend system 102, each transport stream being associated with a corresponding network ID, to subscriber devices 104. For example, subscriber devices 104A and 104B may be part of network "N1" and receive transport streams associated with network "N1." Further, subscriber device 104C may be part of network "N2" and receive transport streams associated with network "N2." In an embodiment, a portion of subscriber devices 104 within a specific network, such as within network "N1," are further assigned a service group (SG), identified by a service group ID (SGID). In an embodiment, each subscriber device is assigned only one SGID. As described above, a subscriber device such as subscriber device 104A includes its assigned SGID in its request to cable headend system 102 for content such as VOD or DVR content. Cable headend system 102 may verify the SGID sent by subscriber devices 104 to determine whether to provide the requested content.

In an embodiment, communication network 106 includes two or more different network infrastructures with separately configured networks and associated subscriber devices 104. For example, each network infrastructure and connectivity of subscriber devices 104 to that network infrastructure may be managed and maintained by a separate entity, e.g., cable company. In another example, one of the network infrastructures may be a legacy implementation having different network configurations than that of the other network infrastructure. In either case, because the networks within each network infrastructure may be configured independently, two networks from respective network infrastructures may be assigned the same identifier, i.e., network ID. In an embodiment, to differentiate between two similarly named networks, subscriber device 104 may determine a plant ID for identifying its associated network infrastructure.

In an embodiment, to enable subscriber devices 104 to identify their assigned service group, cable headend system 102 generates and manages a configuration file 112. Configuration file 112 includes information that subscriber devices 104 use to discover their respective assigned service groups. As further described with respect to FIG. 2, configuration file 112 may include associations between network characteristics (e.g., a plant ID or a network ID) and an SGID, a list of transport stream IDs (TSIDs), and a list of RFs. In an embodiment, cable headend system 102 continually or periodically broadcasts configuration file 112 to subscriber devices 104 via communication network 106. In an embodiment, cable headend system 102 broadcasts configuration file 112 via communication network 106 upon request by one or more of subscriber devices 104. For example, subscriber device 104A may request configuration file 112 upon start-up.

In an embodiment, subscriber devices 104 are clients that communicate with cable headend system 102 to provide content viewers with media content. A person skilled in the art(s) will appreciate that a client may be any computing device or application executing on a computing device that communicates with one or more servers implementing cable headend system 102. For example, subscriber device 104A may be a set-top box connected to a cable modem, or a set-top box having cable modem functionalities. A person skilled in the art(s) will also appreciate that a server from cable headend system 102 may be any host computing device, an application executing on a computing device or a hardware/software system that distributes applications or services, e.g., media content within transport streams, to one or more clients.

In an embodiment, to discover a service group associated with subscriber devices 104, each of subscriber devices 104 may include cable interface 114, processor 116, and memory 118. In an embodiment, cable interface 114 may represent a cable modem or a component having cable-modem functionality to enable two-way data communications between its respective subscriber device 104 and cable headend system 102. In other embodiments, cable interface 114 may represent an interface enabling its respective subscriber device 104 to communicate with a coupled cable modem connected to communication network 106.

In an embodiment, to discover an associated service group, processor 116 retrieves a configuration file 112 from memory 118 which is received via cable modem interface 114. Then, as further described with respect to FIG. 4, processor 116 may perform one or more routines to filter the received and stored configuration file 112 to discover its service group. Upon determining the service group, identified by an SGID, processor 116 may store the SGID to memory 118 for future use. For example, as discussed above, subscriber device 104A may include the SGID in a content request to cable headend system 102 for VOD or DVR content.

FIG. 2 illustrates a service group discovery (SGD) listing 200 included in a configuration file according to an example embodiment. For example, SGD listing 200 may represent information stored in configuration file 112 configured by cable headend system 102 of FIG. 1. In an embodiment, to enable subscriber devices 104 from FIG. 1 to self-discover their associated service groups, each of associations 220-232 from SGD listing 200 stores a mapping between network characteristics (e.g., plant ID 202 and network ID 204) and an SGID 206, a list of TSIDs (represented by TSID 208), and a list of RFs (represented by RFs 210). In an embodiment, as shown in FIG. 2, SGD listing 200 is a table data structure with associations 220-232 being the rows of the table. In another embodiment, SGD listing 200 may be configured using a different data structure such as a linked list, a tree, or a hash map etc. In the embodiment where SGD listing 200 is a linked list, for example, each of associations 220-232 may be stored within a node within the linked list.

In an embodiment, by associating an SGID 206 with multiple RFs 210, each of subscriber devices 104 may tune to more than one RF to discover its associated service group. This approach reduces the effect that outages have on subscriber devices 104. As described above with respect to FIG. 1, SGD listing 200 may include plant ID 202 and network ID 204 to enable subscriber devices 104 operating within different network infrastructures to discover respective service groups based on the same SGD listing 200. For example, a subscriber device 104A configured to operate with plant ID 2 and network ID 30 may tune to one or more RFs 210 in association 230 to determine an associated SGID. In this example, if subscriber device 104A extracts a TSID from a tuned RF, from association 230, that matches one of the TSIDs in association 230, then subscriber device 104A determines that SGID "3" identifies the service group in which subscriber device 104A belongs.

In an embodiment, to prevent mapping overlaps or conflicts, SGD listing 200 is generated such that for each service group, i.e., each SGID, the TSID and RF mapping is unique. As shown in SGD listing 200, a specific set of network characteristics may be associated with multiple service groups. For example, the Plant ID "1" and Network ID "30" pair is associated with associations 220 and 222 representing SGID 400 and 401, respectively.

Figure 3:
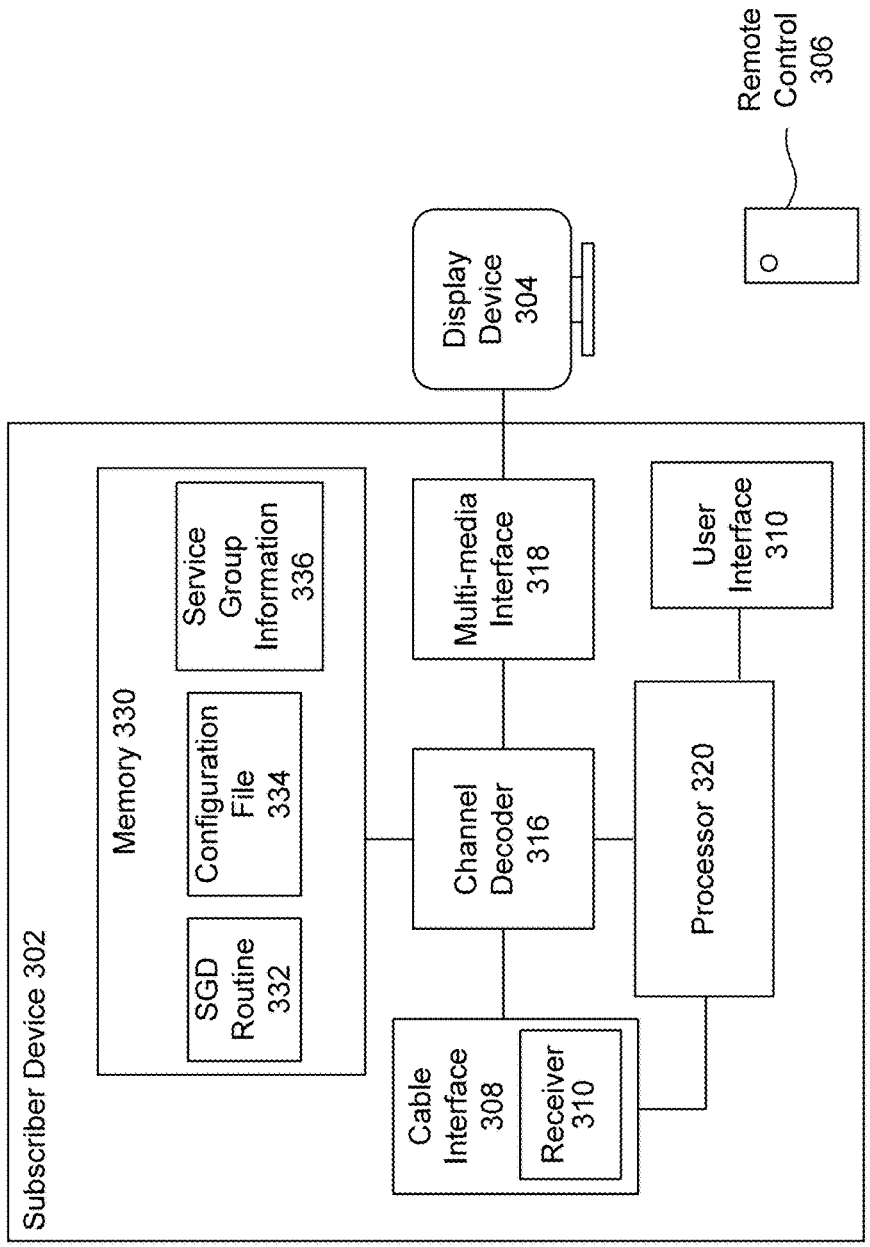
FIG. 3 illustrates a block diagram of a subscriber device in greater detail according to an example embodiment.

FIG. 3 illustrates a block diagram of subscriber device 302 according to an example embodiment. In an embodiment, subscriber device 302, e.g., a set-top box, may be an example implementation of one or more of subscriber devices 104 from FIG. 1. Subscriber device 302 includes cable interface 308, channel decoder 316, multi-media interface 318, user interface 310, processor 320, and memory 330. For ease of explanation, reference may be made to SGD listing 200 of FIG. 2.

Memory 330 includes service group discovery (SGD) routine 332, configuration file 334, and service group (SG) information 336. In an embodiment, SGD routine 332 includes stored instructions that processor 320 performs to discover a service group assigned to subscriber device 302. In an embodiment, SGD routine 332 is retrieved from memory 330 and executed by processor 320 whenever subscriber device 302 needs to determine the SGID that identifies its assigned service group. For example, SGD routine 332 may be stored in a boot loader and is executed by processor 320 upon startup of subscriber device 302 within a particular network. In another example, processor 320 may execute SGD routine 332 when a previously determined SGID changes due to an outage on the frequency in use. In another example, processor 320 may run SGD routine 332 upon request by cable headend system 102 to adapt to changes implemented by cable headend system 102. For example, cable headend system 102 may update which service group is assigned to subscriber device 302.

Configuration file 334 may be a configuration file stored in memory and that is received by subscriber device 302 from a cable headend system, such as cable headend system 102 in FIG. 1. In an embodiment, subscriber device 302 may receive configuration file 334 upon startup of subscriber device 302. In an embodiment, subscriber device 302 may receive an updated configuration file from the cable headend system while in operation. As described above with respect to FIG. 1, configuration file 334 includes an SGD listing, such as SGD listing 200 from FIG. 2, that maps network characteristics to an SGID, a list of TSIDs, and a list of RFs.

Service group (SG) information 336 may include information related to an SGID identified by processor 320 while running SGD routine 332. In an embodiment, SG information 336 includes detected network characteristics, the identified SGID, and the identified corresponding TSID and tuned RF. In an embodiment, since processor 320 determines the SGID using the stored configuration file 334, SG information 336 includes only information obtainable from configuration file 334. In subsequent operations, subscriber device 302 may query service group information 336 for the SGID to include in a content request to a content source, such as cable headend system 102 of FIG. 1.

Cable interface 308 enables subscriber device 302 to communicate with a cable headend system such as cable headend system 102 of FIG. 1. In an embodiment, cable interface 308 includes receiver 310 for performing tuning and demodulating operations. For example, receiver 310 may include a tuner that tunes to an RF and extracts a transport stream from the tuned RF. In an embodiment, cable interface 308 includes multiple tuners for concurrently tuning to multiple RFs and extracting the corresponding transport streams. Further, for each tuned RF, subscriber device 202 identifies the TSID from the extracted transport stream that identifies the transport stream. In an embodiment, receiver 312 is controlled by processor 320 to select and tune to a specific RF.

In an embodiment, subscriber device 104 tunes to one or more RFs to extract media content from transport streams transmitted on respective RFs. As described above, the extracted media content may include, for example, a television channel or VOD content requested by a content viewer. Depending on subscriber devices 104 implementation and communication network 106, one or more of subscriber devices 104 may tune to one or more RFs received from one or more of an Ethernet cable, a satellite dish, a telephone line, a VHF or UHF antenna, or a coaxial cable.

In an embodiment, cable interface 308 includes one or more demodulators that transform the transport stream signals from the tuners into a signal that display device 304, e.g., a television, can use to present the desired content, e.g., TV channel or VOD content, to a content viewer. Digital TV systems often transmit multiple TV channels through a single physical channel of a transport stream. Therefore, a demodulator may be needed to extract the desired TV channel from the single physical channel. Demodulation types may include various formats including, for example, Quadrature Phase Shift Key (QPSK), Quadrature Amplitude Modulation (QAM), and Orthogonal Frequency Division Multiplexing (OFDM) to provide some examples.

In an embodiment, cable interface 308 includes cable modem functionality for providing a two-way communication interface between subscriber device 3302 and a cable provider, such as cable headend system 102 of FIG. 1. Cable interface 308 may deploy, but is not limited to, a DOCSIS-based standard (e.g., DOCSIS or EuroDOCSIS) for communicating out-of-band requests, commands, and subscriber device information. For example, cable interface 208 may implement QAM demodulators for receiving downstream data and QPSK or QAM modulators for transmitting upstream data.

Channel decoder 316 receives, from cable interface 308, a content signal representative of media content, for example, a TV channel or VOD or DVR content. Channel decoder 316 may be associated with demultiplexers to separate the TV channel into video, audio, or other streams of data. Then, channel decoder 316 may decode or decompress one or more streams of data for processing by display device 304, such as a television.

Multi-media interface 318 may include video and audio interfaces for transmitting the content stream, e.g., TV channel, to display device 304 for broadcast. Example video and audio interfaces may include HDMI or AVI. Therefore, multi-media interface 318 may be coupled to a variety of display device 304 including, for example, a television, a laptop, or a monitor among other display devices.

User interface 310 may implement wireless communication protocols such as Wi-Fi or infrared to receive an input from remote control 306 operated by a content viewer. In an embodiment, content user operates remote control 306 to request content provided by a cable headend system such as cable headend system 102. For example, the requested content may be VOD content or DVR content. In an embodiment, to provide the content viewer with the requested content, subscriber device 302 can send to the headend system the request with its SGID. The headend system may be required to verify the SGID before enabling the subscriber device 302 to receive and process the requested content. In an embodiment, to enable subscriber device 302 to discover its SGID, as described below, processor 320 implements SGD routine 332 stored in memory 330.

Processor 320 may control the functionality of subscriber device 302 and communicate with, for example, cable headend system 102. In an embodiment, processor 320 retrieves SGD routine 332 from memory 330 to perform operations for discovering the service group of subscriber device 302, as described below with respect to FIG. 4.

FIG. 4 is a method 400 for service group discovery by a subscriber device according to an example embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary method 400 of a subscriber device, such as subscriber device 302 of FIG. 3 or subscriber device 104 of FIG. 1, for service group discovery. Steps of method 400 need not necessarily be performed in the order shown. For example, step 404 may be performed before step 402. Method 400 may be performed by processing logic that can comprise hardware (e.g., circuitry, dedicated logic, programmable logic, microcode, etc.), software (e.g., instructions run on a processing device), or a combination thereof.

In step 402, a subscriber device receives a configuration file. In an embodiment, the subscriber device receives the configuration file from a cable headend system, such as cable headend system 102 of FIG. 1. The configuration file includes information, such as SGD listing 200 of FIG. 2, used by subscriber device to discover its associated service group. In an embodiment, the subscriber device receives the configuration file when the subscriber device detects no associated service group, as identified by an SGID. For example, the subscriber device may receive the configuration file upon startup of the subscriber device or when an outage occurs.

In step 404, the subscriber device detects network characteristics associated with the subscriber device. In an embodiment, the network characteristics include information identifying the network infrastructure and the network assigned to the subscriber device. For example, network infrastructure may be identified as Plant ID 202 from SGD listing 200 and the network may be identified as Network ID 204 from SGD listing 200. In an embodiment, to detect the network characteristics, the subscriber device extracts Network ID 204 from within a received transport stream, such as from a network information table (NIT) table within an MPEG transport stream.

As discussed above, two subscriber devices may be configured to communicate with two differently-configured network infrastructures. And within each network infrastructure, a specific network may be identified according to a convention specific to that network infrastructure. In an embodiment, subscriber devices associated with two differently-configured network infrastructures may be part of the same service group. Therefore, in this embodiment, to discover the same service group for these subscriber devices, the subscriber device operates on the received configuration file of step 402 based on the corresponding detected network characteristics.

In step 406, the subscriber device parses the configuration file of step 402 to select one or more associations from an SGD listing of the configuration file. For example, the SGD listing may be SGD listing 200 of FIG. 2. In an embodiment, each association of the SGD listing associates specific network characteristics with an SGID, a list of TSIDs, and a list of RFs. In an embodiment, the subscriber device selects, from the SGD listing, one or more associations having the network characteristics detected in step 404. For example, the subscriber device may receive SGD listing 200 of FIG. 2 and detect Plant ID 202 of "1" and a Network ID 204 of "30." In this example, the subscriber devices parses SGD listing 200 to select associations 220-222 matching the detected Plant ID "1" and Network ID "30." In an embodiment, each identified association, such as associations 220-222 for Plant ID "1" and Network ID "30," is associated with a unique service group, identified as SGID 206.

In an embodiment, to discover an assigned service group, the subscriber device tunes to an RF to extract information from the transport stream transmitted on that tuned RF. In an embodiment, the use of an SGD listing of the configuration file received in step 402 provides the subscriber device with a plurality of RFs to tune to discover the service group. Further, using the SGD listing does not require additional communications between the subscriber device and a headend system.

In step 408, the subscriber device tunes to a RF in a selected association of the selected one or more associations of step 406. For example, if the selected associations were associations 220-222, then the subscriber device may tune to RF "483" from the list of RFs "465, 471, 483" of selected association 220. In an embodiment where the subscriber device includes two or more tuners, the subscriber device may currently tune to more than one RF where each tuner may tune to a different RF from the RFs 210 of selected association 220. By tuning to multiple RFs, the subscriber device may be able to more quickly determine an assigned service group. Similarly, steps 410, 412, and 416-420 (as described below) may be performed concurrently for each tuned frequency.

In step 410, the subscriber device identifies a TSID of the tuned RF of step 408. As discussed above, the identified TSID identifies the transport stream transmitted on the tuned RF. For a received MPEG transport stream, for example, the subscriber device may extract the TSID from a Program Association Table (PAT).

In step 412, the subscriber device verifies whether the identified TSID matches any of the TSIDs within the selected association of step 408. Upon verification, method 400 proceeds to step 414 if there exists a match or to step 416 if no such match exists. For example, for selected association 220 and a tuned RF "465", the subscriber device verifies whether the identified TSID is any of TSIDs "103, 51, 1005" within association 220 and associated with RFs "465, 471, 483." If the identified TSID is, for example, RF "465," then the subscriber devices finds a matching TSID from the list of TSIDs 208 associated with the selected association 220.

In step 414, the subscriber device determines the SGID, identifying its service group, based on the matched TSID of step 412. In an embodiment, the matched TSID and tuned frequency represents a unique paring associated with a specific SGID. In an embodiment, upon determining that the identified TSID matched one of the TSIDs in the selected association, the subscriber device determines the SGID within that selected association. For example, for a selected association 220 from SGD listing 200 and a matched TSID of "103," the subscriber device determines that SGID "400" identifies the service group associated with the subscriber device. In an embodiment, the subscriber device stores in its memory the determined SGID and the identified unique paring of the matched TSID and tuned RF for future use. From the above example, the subscriber device stores SGID "400" and associated information such as matched TSID "103" and tuned RF "483." Future use may include a content requests sent by the subscriber device to a headend system such as cable headend system 102 of FIG. 1. For example, the subscriber device looks up the stored SGID "400" to include as a parameter in a request to a headend system for VOD or DVR content.

In an embodiment, the subscriber device re-verifies the stored SGID. For example, the subscriber device may periodically or intermittently verify the SGID as stored in step 414. In an embodiment, the subscriber device verifies the stored SGID on demand. For example, upon receiving a request from a user for VOD or DVR content, the subscriber device may re-verify the stored SGID. In an embodiment, the subscriber device verifies the SGID by tuning to the stored associated RF to determine whether a TSID of the tuned RF matches the stored TSID associated with the SGID. If verification fails, the subscriber device may reinitiate one or more steps of method 400 to re-discover the SGID.

In step 416, the subscriber device determines whether any RFs within the selected association of step 408 remain for tuning. In an embodiment, by providing more than one RF to associate with an SGID, the possibility for outages is reduced because it is likely that at least one of the multiple transport streams transmitted on a respective RF is in normal operation. If no RF remains for tuning, i.e., each of the RFs associated with the selected association has been tuned to determine an SGID, then method 400 proceeds to step 418. Otherwise, method 400 proceeds to step 408 where the subscriber device selects the next un-tune RF from the list of RFs associated with the selected association. For example, after tuning to RF "465" and failing to verify a matching TSID in step 412, the subscriber device may tune to the next RF "471" associated with association 220.

In step 418, the subscriber device determines whether a remaining association from the selected one or more associations of 406 can be used to determine its service group. For example, the subscriber device may have selected associations 220-222 from SGD listing 200. Upon failing to verify a matching TSID for RFs "465, 471, 483" within association 222, the subscriber device may select and process information from the next association 222 to determine the service group associated with the subscriber device. In an embodiment, if no more associations remain, then the subscriber device is unable to determine the service group and method 400 proceeds to step 422. Otherwise, method 400 proceeds to step 420.

In step 420, the subscriber device selects a remaining association as determined in step 418. Then, method 400 proceeds to step 408 where the subscriber device tunes to an RF from the selected, remaining association.

In step 422, an error occurs because the service group was not discovered. In an embodiment, the subscriber device provides an output to a content viewer to indicate the error. For example, the error may represent an outage at the headend system providing the subscriber device with media content.

The representative functions described herein can be implemented in hardware, software, or some combination thereof. For instance, the representative functions can be implemented using computer processors, computer logic, application specific circuits (ASIC), digital signal processors, etc., as will be understood by those skilled in the art(s)s based on the discussion given herein. Accordingly, any processor that performs the functions described herein is within the scope and spirit of the embodiments presented herein.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art(s) to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for discovering a service group, comprising:
receiving, by a subscriber device from among a plurality of subscriber devices, a configuration file that stores a listing of mappings, wherein each association of the listing of mappings maps network characteristics to a service group identification (SGID), a list of transport stream IDs (TSIDs), and a list of radio frequencies (RFs);
selecting, by the subscriber device from the listing of mappings, one or more associations related to a network characteristic, wherein the network characteristic includes a plant ID identifying a physical network infrastructure for carrying transport streams between the plurality of subscriber devices and a headend system and a network ID specifying a portion of the physical network infrastructure associated with the subscriber device;
tuning, by the subscriber device, to an RF selected from the list of RFs within a selected association to identify a TSID of the tuned RF;
verifying, by the subscriber device, whether the identified TSID matches a TSID from the list of TSIDs associated with the selected association; and
in response to the verifying, determining, by the subscriber device, that the SGID in the selected association identifies the service group for the subscriber device.

2. The method of claim 1, further comprising:
extracting the network ID from a network information table (NIT) of mappings in a received transport stream.

3. The method of claim 1, further comprising:
repeating, by the subscriber device, the tuning for each RF, from the list of RFs, until a corresponding identified TSID matches a TSID from the list of TSIDs.

4. The method of claim 1, further comprising:
repeating, by the subscriber device, the tuning for each RF, from each list of RFs corresponding to the one or more associations, until a corresponding identified TSID matches a TSID from the list of TSIDs.

5. The method of claim 1, further comprising:
storing the mapping of network characteristics to the SGID, the identified TSID, and the tuned RF; and
specifying the stored SGID in a request for video-on demand (VOD) content or digital video recorder (DVR) content sent to a headend.

6. The method of claim 1, further comprising:
receiving a request to access video-on demand (VOD) or digital video recorder (DVR) content; and
verifying the determined SGID by matching the associated TSID, in the selected one or more associations, with a TSID retrieved from tuning to the RF of the selected one or more associations.

7. The method of claim 1, further comprising:
reinitiating the method for discovering the service group upon failing to verify the identified TSID; and
verifying the determined SGID by matching the associated TSID, in the selected one or more associations, with a TSID retrieved from tuning to the RF of the selected one or more associations.

8. The method of claim 1, further comprising:
receiving a command from a headend to rediscover the SGID; and
reinitiating the method for discovering the service group.

9. The method of claim 1, further comprising:
initiating the method for discovering the service group upon a start-up of the subscriber device.

10. A subscriber device for discovering a service group, comprising:
a memory that stores instructions; and
a processor, coupled to the memory, configured to execute the instructions, the instructions, when executed by the processor, configuring the processor to:
receive a configuration file that stores a listing of mappings, wherein each association of the listing of mappings maps network characteristics to a service group identification (SGID), a list of transport stream IDs (TSIDs), and a list of radio frequencies (RFs);
select one or more associations related to a network characteristic from the listing of mappings, wherein the network characteristic includes a plant ID identifying a physical network infrastructure for carrying transport streams between a plurality of subscriber devices and a headend system and a network ID specifying a portion of the physical network infrastructure associated with the subscriber device;
tune to an RF selected from the list of RFs within a selected association to identify a TSID of the tuned RF;
verify whether the identified TSID matches a TSID from a list of TSIDs associated with the selected association; and
in response to the verify, determine that the SGID in the selected association identifies the service group for the subscriber device.

11. The subscriber device of claim 10, wherein the instructions, when executed by the processor, further configure the processor to extract the network ID from a network information table (NIT) of mappings present in a received transport stream to detect the network characteristic.

12. The subscriber device of claim 10, wherein the instructions, when executed by the processor, further configure the processor to:
repeat, by the subscriber device, the tuning for each RF, from the list of RFs, until a corresponding identified TSID matches a TSID from the list of TSIDs.

13. The subscriber device of claim 10, wherein the instructions, when executed by the processor, further configure the processor to:
repeat, by the subscriber device, the tuning for each RF, from each list of RFs corresponding to the one or more associations, until a corresponding identified TSID matches a TSID from the list of TSIDs.

14. The subscriber device of claim 10, wherein the instructions, when executed by the processor, further configure the processor to:
store the mapped network characteristics to the SGID, the identified TSID, and the tuned RF; and
specify the stored SGID in a request for video-on demand (VOD) content or digital video recorder (DVR) content sent to a headend.

15. The subscriber device of claim 10, wherein the instructions, when executed by the processor, further configure the processor to:
receive a request to access video-on demand (VOD) or digital video recorder (DVR) content; and
verify the determined SGID by matching the associated TSID, in the selected one or more associations, with a TSID retrieved from tuning to the RF of the selected one or more associations.

16. The subscriber device of claim 10, wherein the instructions, when executed by the processor, further configure the processor to:
reinitiate the processor to determine the service group upon failing to verify the identified TSID; and
verify the determined SGID by matching the associated TSID, in the selected one or more associations, with a TSID retrieved from tuning to the RF of the selected one or more associations.

17. The subscriber device of claim 10, wherein the instructions, when executed by the processor, further configure the processor to:
receive a command from a headend to re-determine the SGID; and
reinitiate the processor to identify the service group.

18. A non-transitory machine-readable medium having instructions stored thereon that, when executed by one or more processors of a subscriber device, causes the one or more processors to perform operations comprising:
receiving a configuration file that stores a listing of mappings, wherein each association of the listing of mappings maps network characteristics to a service group identification (SGID), a list of transport stream IDs (TSIDs), and a list of radio frequencies (RFs);
selecting one or more associations related to a network characteristic from the listing of mappings, wherein the network characteristic includes a plant ID identifying a physical network infrastructure for carrying transport streams between the plurality of subscriber devices and a headend system and a network ID specifying a portion of the physical network infrastructure associated with the subscriber device;
tuning to an RF selected from the list of RFs associated with a selected association to identify a TSID of the tuned RF;
verifying whether the identified TSID matches a TSID from the list of TSIDs within the selected association; and
in response to the verifying, determining that the SGID in the selected association identifies the service group for the subscriber device.

* * * * *